United States Patent
Williams et al.

(10) Patent No.: US 10,762,804 B2
(45) Date of Patent: Sep. 1, 2020

(54) SYSTEMS AND METHODS FOR ELECTRONIC SIGN LABELS

(71) Applicant: Walmart Apollo, LLC, Bentonville, AR (US)

(72) Inventors: Jonathan Michael Williams, Rogers, AR (US); Bruce W. Wilkinson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/910,813

(22) Filed: Mar. 2, 2018

(65) Prior Publication Data

US 2018/0253997 A1    Sep. 6, 2018

Related U.S. Application Data

(60) Provisional application No. 62/466,624, filed on Mar. 3, 2017.

(51) Int. Cl.
| | | |
|---|---|---|
| *G06F 17/00* | (2019.01) | |
| *G09F 3/20* | (2006.01) | |
| *G06K 7/10* | (2006.01) | |
| *H02J 7/02* | (2016.01) | |
| *H02J 7/34* | (2006.01) | |

(Continued)

(52) U.S. Cl.
CPC ......... *G09F 3/208* (2013.01); *G06K 7/10366* (2013.01); *G06K 19/0701* (2013.01); *G06K 19/0709* (2013.01); *G06K 19/0716* (2013.01); *G09F 27/00* (2013.01); *H02J 7/00* (2013.01); *H02J 7/025* (2013.01); *H02J 7/345* (2013.01);
(Continued)

(58) Field of Classification Search
CPC ....... G06Q 30/02; G07F 7/1008; G06K 17/00
USPC ........................................................ 235/375
See application file for complete search history.

(56) References Cited

U.S. PATENT DOCUMENTS 6,715,676 B1     4/2004  Janning
7,286,053 B1 *  10/2007  Gudeman .......... G08B 13/2414
                                                  340/572.1

(Continued)

FOREIGN PATENT DOCUMENTS

| | | |
|---|---|---|
| EP | 2876628 A2 | 5/2015 |
| WO | 2015/061437 A1 | 4/2015 |
| WO | 2015/136146 A1 | 9/2015 |

OTHER PUBLICATIONS

Chilcote, With lorktech, case students, poised to enter growing flexible electronics market. Retrieved online at: http://www.hivelocitymedia.com/features/lorktech051712.aspx. 5 pages, May 17, 2012.

*Primary Examiner* — Ahshik Kim
(74) *Attorney, Agent, or Firm* — McCarter & English, LLP (57) ABSTRACT

Systems and methods are provided for using a rechargeable electronic sign label. Exemplary embodiments include an electronic sign label electrically coupled to a capacitor and an RFID tag. One or more RFID readers are in communication with the RFID tag. The RFID tag is configured to determine when the charge of the capacitor is below a threshold value, and in response transmit a message to the RFID readers. At least one RFID reader transmits a signal to the RFID tag that includes an instructions to charge the capacitor. An antenna of the RFID tag may be electrically coupled to the capacitor to allow the capacitor to charge based on the energy collected by the RFID tag antenna.

15 Claims, 6 Drawing Sheets

(51) Int. Cl.
*G06K 19/07* (2006.01)
*G09F 27/00* (2006.01)
*H02J 50/10* (2016.01)
*H02J 7/00* (2006.01)
*H01M 10/42* (2006.01)

(52) U.S. Cl.
CPC ......... *H02J 50/10* (2016.02); *H01M 10/4257* (2013.01); *H02J 7/00034* (2020.01)

(56) References Cited

U.S. PATENT DOCUMENTS

| | | |
|---|---|---|
| 7,651,026 B2 | 1/2010 | Nagamachi |
| 2011/0147468 A1* | 6/2011 | Park ................... G06K 19/0704 235/492 |
| 2014/0258028 A1 | 9/2014 | Bynum et al. |
| 2015/0270776 A1* | 9/2015 | Mallik ................. H02M 3/156 307/31 |
| 2015/0310775 A1 | 10/2015 | Cho et al. |
| 2017/0317511 A1* | 11/2017 | Keysar ................... H02J 7/355 |

\* cited by examiner

FIG. 6

SYSTEMS AND METHODS FOR ELECTRONIC SIGN LABELS

RELATED APPLICATION

This application claims priority to U.S. Provisional Patent Application No. 62/466,624 filed on Mar. 3, 2017, which is hereby incorporated by reference in its entirety.

BACKGROUND

Electronic sign labels (ESLs) enable a display of information. The information being displayed by the electronic sign label can be wirelessly updated. As a result, the dynamic nature of electronic sign labels provides significant cost savings over static signs.

SUMMARY

In one embodiment, a system for using a rechargeable electronic sign label includes an electronic sign label with an electronic display interface configured to display text and to be updated dynamically, a capacitor electrically coupled to the electronic sign label, and an RFID tag coupled to the electronic sign label. The RFID tag includes at least one antenna to collect energy and a memory to store data. The stored data represents the text displayed at the electronic display interface. The system also includes one or more RFID readers in communication with the RFID tag. The RFID tag is configured to determine when the charge of the capacitor is below a threshold value, and in response, transmit a message to the RFID readers. At least one of the RFID readers transmits a signal to the RFID tag that includes an instruction to charge the capacitor.

In another embodiment, a method for using a rechargeable electronic sign label is provided. The method includes providing an electronic sign label with an electronic display interface configured to display text, electrically coupling a capacitor to the electronic sign label, and coupling an RFID tag to the electronic sign label. The RFID tag includes at least one antenna to collect energy and a memory to store data. The stored data represents the text displayed at the electronic display interface. The method further includes determining at the RFID tag that the charge of the capacitor is below a threshold value, and transmitting, in response to determining that the charge of the capacitor is below a threshold value, a message to one or more RFID readers in communication with the RFID tag. The method also includes receiving a signal from at least one of the RFID readers at the RFID tag that contains an instruction to charge the capacitor.

In yet another embodiment, a system for using a rechargeable electronic sign label in a retail environment is provided. The system includes an electronic sign label affixed to a shelf housing an item. The electronic sign label includes an electronic display interface configured to display a price of the item. A supercapacitor is electrically coupled to the electronic sign label, and an RFID tag is coupled to the electronic sign label. The RFID tag includes at least one antenna to collect energy and a memory to store data. The stored data represents the text displayed at the electronic display interface. One or more RFID readers are in communication with the RFID tag. The RFID tag is configured to determine when the charge of the supercapacitor is below a threshold value, and in response, transmit a message to the RFID readers. At least one of the RFID readers transmits a signal to the RFID tag that includes an instruction to charge the supercapacitor. The RFID readers are configured to transmit data to the RFID tag to display an updated price of the item on the electronic sign label.

BRIEF DESCRIPTION OF THE DRAWINGS

The accompanying drawings, which are incorporated in and constitute a part of this specification, illustrate one or more embodiments of the present invention and, together with the description, help to explain the present invention. The embodiments are illustrated by way of example and should not be construed to limit the present invention. In the drawings.

DETAILED DESCRIPTION

Electronic sign labels offer the ability to wirelessly update displayed content on signage quickly and efficiently, without the need to print paper tags or to deploy multiple personnel to change them manually. In addition to reducing staff needs to support information changes, electronic sign labels offer the ability to update information, such as item price, as often as wanted (dynamic pricing), while at the same time reducing information errors to customers. Using electronic sign labels retailers can offer dynamic pricing that responds to customer traffic patterns or that responds to an event, such as offering umbrellas at a promotional price as rain starts.

Conventional electronic sign labels include a battery to power the display. However, the battery may lose power quickly when the display is updated frequently. When the battery dies in conventional electronic sign labels, the battery needs to be replaced manually which requires staff. Thus, there is a need for an electronic sign label system that has a long-lasting battery life, and that can be charged wirelessly.

Systems and methods are described herein for a rechargeable electronic sign label. Exemplary embodiments include electronic sign labels, each of which includes an electronic display interface. The electronic sign label is coupled to a capacitor and an RFID tag with at least one antenna. In one embodiment, the capacitor is a supercapacitor. Multiple antennas associated with other RFID tags in a facility receive a signal from an ESL and are connected to a system that assembles the multiple signals to identify the ESL needing charging. Software RFID reader are disposed in a facility and are configured to communicate or interrogate the RFID tag coupled to the electronic sign label. In exemplary embodiments, the RFID tag is configured to determine when the charge of the capacitor is below a threshold value, and in response to determining that the charge of the capacitor is below a threshold value, transmit a message to one or more RFID readers in the facility. For example, in one embodiment, the RFID tag may measure the capacitor charge by placing a load on the capacitor and comparing the measured charge against pre-determined criteria indicative of adequate and non-adequate charge values. At least one of the RFID readers transmits a signal to the RFID tag that includes an instruction to charge the capacitor.

The RFID tags contain an integrated circuit and at least one antenna. The integrated circuit facilitates storing and processing information, modulating and demodulating a radio-frequency signal, collecting DC power from the incident reader signal, and other functions. The antenna facilitates receiving and transmitting the signal, and also collecting and storing energy from the signal. The tag information is stored in a memory of the tag. The memory also stores data that corresponds to the text displayed on the electronic display interface of the electronic sign label. In one embodiment, the memory may also store the predetermined criteria for capacitor charge values.

The RFID reader transmits an encoded radio signal to interrogate an RFID ESL tag. The RFID ESL tag receives the message and then responds with its identification and other information. In one embodiment, the RFID ESL tag transmittal is received by multiple antennas of other RFID tags in the facility which forward the signal to the one or more RFID readers. The one or more RFID readers reassemble the signals into the original request transmitted by the RFID ESL tag. In the event geography or other reasons keep the RFID reader from sending a signal directly to the RFID ESL tag, the RFID reader can compute a return path to the RFID ESL tag using all the antennas of the other RFID ESL tags simultaneously to construct a coherent signal. Since tags have individual serial numbers, the RFID system design can discriminate among several tags that might be within the range of the antennas and read them simultaneously. In one embodiment, a single RFID reader may manage all of the antennas and RFID ESL tags in a facility. In another embodiment, multiple RFID readers may cooperate to manage the RFID ESL tags in the facility.

Figure 1:
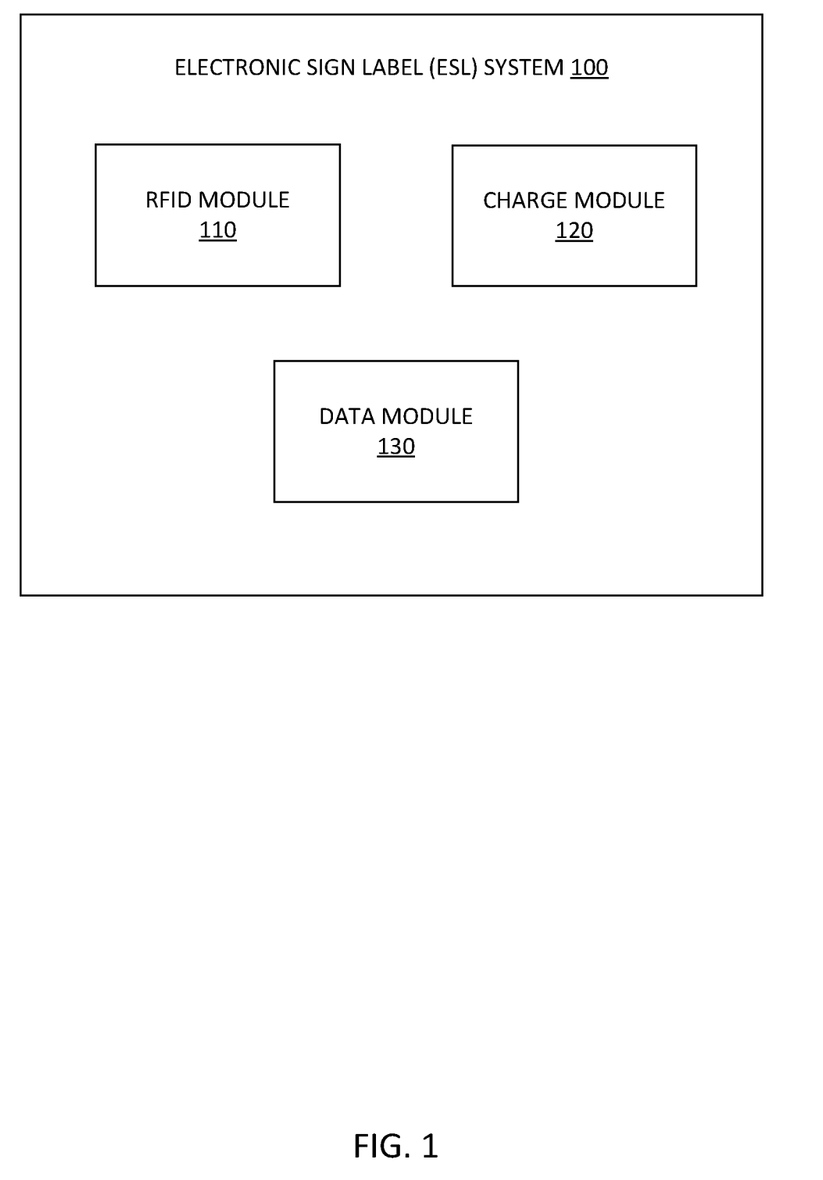
FIG. 1 is a block diagram showing an exemplary electronic sign label (ESL) system, according to an example embodiment.

FIG. 1 is a block diagram showing an electronic sign label (ESL) system 100 in terms of modules, according to an example embodiment. The one or more of the modules may be implemented in server 530 shown in FIG. 5. The modules include an RFID module 110, a charge module 120, and a data module 130. The modules may include various circuits, circuitry and one or more software components, programs, applications, or other units of code base or instructions configured to be executed by one or more processors (e.g., processors included in a device 520 or a server 530 shown in FIG. 5). In other embodiments, one or more of modules 110, 120, 130 may be included in a device (e.g., device 520 shown in FIG. 5), while other of the modules 110, 120, 130 are provided in a server (e.g., server 530 shown in FIG. 5). Although modules 110, 120, 130 are shown as distinct modules in FIG. 1, it should be understood that modules 110, 120, and 130 may be implemented as fewer or more modules than illustrated. It should be understood that any of modules 110, 120, and 130 may communicate with one or more components included in exemplary embodiments of the present disclosure (e.g., electronic sign labels or RFID tags 510, RFID readers 515, device 520, server 530, or database(s) 540 of system 500 shown in FIG. 5).

The RFID module 110 may be configured to manage and maintain RFID tags and RFID readers, and maintain a record of the location of the RFID tags and RFID readers. The RFID module 110 also maintains a record of the item corresponding to the electronic sign label and RFID tag, so that the appropriate text can be updated by the ESL system.

The charge module 120 may be configured to determine the power level of a capacitor coupled to the electronic sign label, and compare it to a threshold value. The charge module 120 may also generate a notification at a computing device if a capacitor at an electronic sign label is malfunctioning or completely exhausted (that is, the capacitor cannot be recharged).

The data module 130 may be configured to manage and analyze data stored at the RFID tag at the electronic sign label. The data module 130 may also prepare and manage messages to the RFID tag instructing the tag to update data displayed at the electronic sign label.

Figure 2:
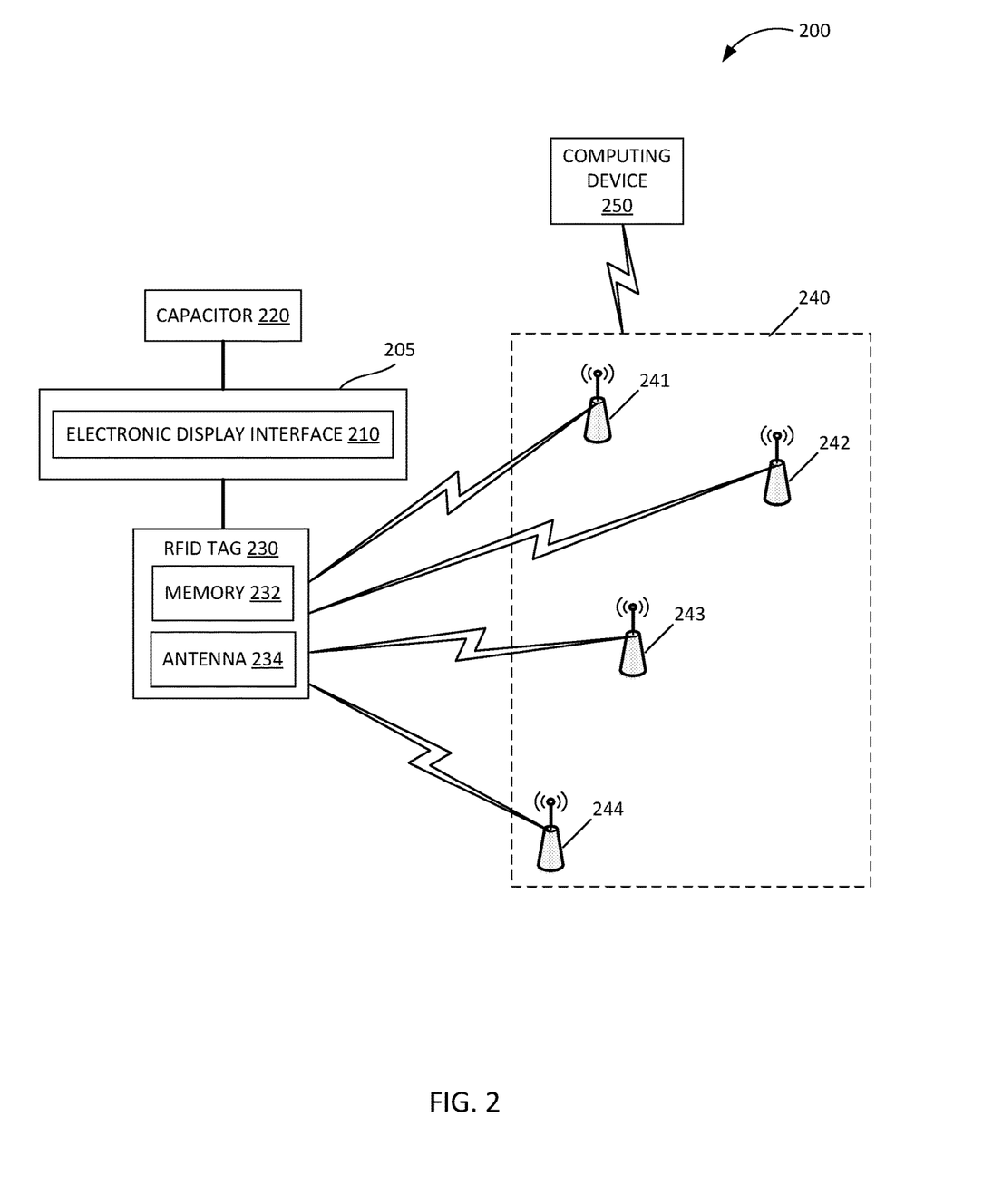
FIG. 2 schematically depicts an exemplary ESL system, according to an example embodiment.

FIG. 2 schematically depicts an exemplary ESL system 200, according to an example embodiment. The ESL system 200 includes an electronic sign label 205 with an electronic display interface 210. The electronic sign label 205 is coupled to a capacitor 220 and the RFID tag 230. The RFID tag 230 includes a memory 232 and at least one antenna 234. The ESL system 200 further includes multiple RFID readers 240 disposed in the facility, for example, RFID reader 241, RFID reader 242, RFID reader 243 and RFID reader 244. A computing device 250 is in communication with the RFID readers 240. The computing device 250 may include one or more components described with respect to computing device 600 of FIG. 6.

The electronic display interface 210 is configured to display text that can be dynamically updated via a message transmitted to the RFID tag 230. The text displayed via electronic display interface 210 is based on data stored in the memory 232 of the RFID tag 230. The computing device 250 may be configured to transmit data to the RFID readers 240 indicating an update to the text displayed at the electronic display interface 210 of the electronic sign label 205. The computing device 250 may identify a particular RFID tag for updating the text based on the item corresponding to the RFID tag and the electronic sign label. The RFID readers 240 may be configured to transmit the data from the computing device 250 to the RFID tag 230, and the RFID tag 230 may store the data in the memory 232 causing the electronic display interface 210 of the electronic sign label 205 to update the text displayed.

In an example embodiment, one of the RFID readers 240 reads the data in the memory 232 of the RFID tag 230 to determine the text presently displayed at the electronic sign label 205.

The RFID tag 230 is configured to determine when the charge of the capacitor 220 is below a threshold value. For example, the RFID tag 230 may measure the capacitor charge by placing a load at the capacitor 220. The RFID tag 230 may measure a voltage drop at the capacitor 220. If a decrease in voltage is measured to be below a threshold value, then the RFID tag 230 determines that the capacitor 220 needs to be charged. When the charge of the capacitor 220 is below the threshold value, the RFID tag 230 transmits a message to one or more of the RFID readers 240. As noted above, this message may be picked up by other RFID antennas in the facility, forwarded and reassembled by the receiving RFID reader. In response, at least one of the RFID readers 240 transmits a signal to the RFID tag 230 that includes an instruction to charge the capacitor 220. The original message transmitted by the RFID tag 230 may include a tag identifier number, and one of the RFID readers 240 transmits the signal to the RFID tag 230 based on the tag identifier number. In one embodiment, the signal may be transmitted to the RFID tag 230 via multiple antennas belonging to other RFID tags in the facility to produce a coherent signal and amplified signal. The RFID tag 230 can rectify the RF into DC current to charge the capacitor. Thus the signal from the RFID readers 240 charges the RFID tag 230. Using this process, the exemplary ESL system 200 is capable of simultaneously charging multiple capacitors at multiple electronic sign labels.

In conventional systems, the RFID readers broadcast a signal to all the RFID tags, however, the signal can experience interruptions and the RFID tag that requires the signal may not even detect it. In the ESL system described here, the RFID reader sends a targeted signal to a particular target RFID tag. The target RFID tag is identified based on the RFID tag broadcasting a request for a signal (when the tag realizes that the capacitor has a low charge). In this manner, the ESL system 200 ensures that the RFID tag receives a signal that it requested to charge the capacitor.

Capacitors can accept and deliver charge much faster than batteries, and tolerate many more charge and discharge cycles than rechargeable batteries. In an example embodiment, the capacitor 220 is a supercapacitor. A supercapacitor is a high-capacity electrochemical capacitor with capacitance values much higher than other capacitors (but lower voltage limits) that bridge the gap between capacitors and rechargeable batteries. Supercapacitors can store 10 to 100 times more energy per unit volume or mass than conventional capacitors.

Figure 3:
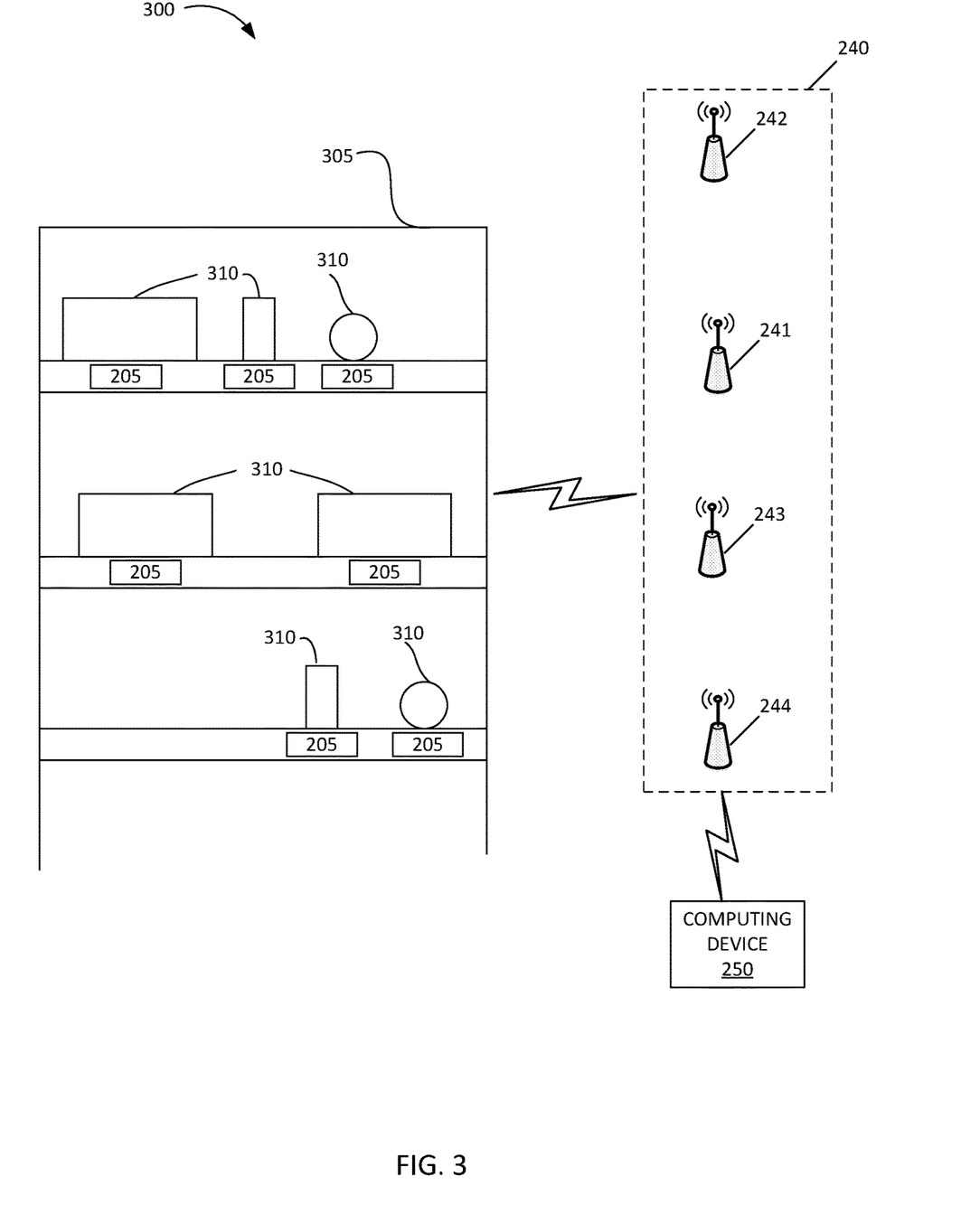
FIG. 3 schematically depicts an exemplary use of an ESL system, according to an example embodiment.

FIG. 3 schematically depicts an exemplary use of an ESL system 300, according to an example embodiment. The exemplary system 300 is for using rechargeable electronic sign labels 205 in a retail environment. The system 300 includes electronic sign labels 205 (described with respect to FIG. 2) affixed to a shelf 305 housing items 310. The electronic sign labels 205 are configured to display a price of the item 310 corresponding to the electronic sign labels 205.

As described above, the electronic display interface 210 is configured to display text, for example a price, that can be dynamically updated via a message transmitted to the RFID tag 230. The text displayed via electronic display interface 210 is based on data stored in the memory 232 of the RFID tag 230. The computing device 250 transmits data to the RFID readers 240 indicating an update to the price displayed at the electronic sign labels 205. The computing device 250 can identify a particular RFID tag for updating the price based on the item 310 corresponding to the RFID tag and the electronic sign label 205.

The RFID tag is configured to determine when the charge of the capacitor coupled to the electronic sign label 205 is below a threshold value. When the charge of the capacitor is below a threshold value, the RFID tag transmits a message to the RFID readers 240. One of the RFID readers 240 transmits a signal to the RFID tag that includes an instruction to charge the capacitor coupled to the electronic sign label 205.

In an example embodiment, the antenna of the RFID tag is electrically coupled to the capacitor to allow the capacitor to charge based on the energy collected by the RFID tag antenna.

In an example embodiment, the RFID tag stores data in the memory causing the electronic display interface of the electronic sign label 205 to update the displayed price. The signal from the RFID readers 240 charges the RFID tag. The RFID readers 240 may read the data in the memory of the RFID tag to determine the price presently displayed at the electronic sign label 205.

Figure 4:
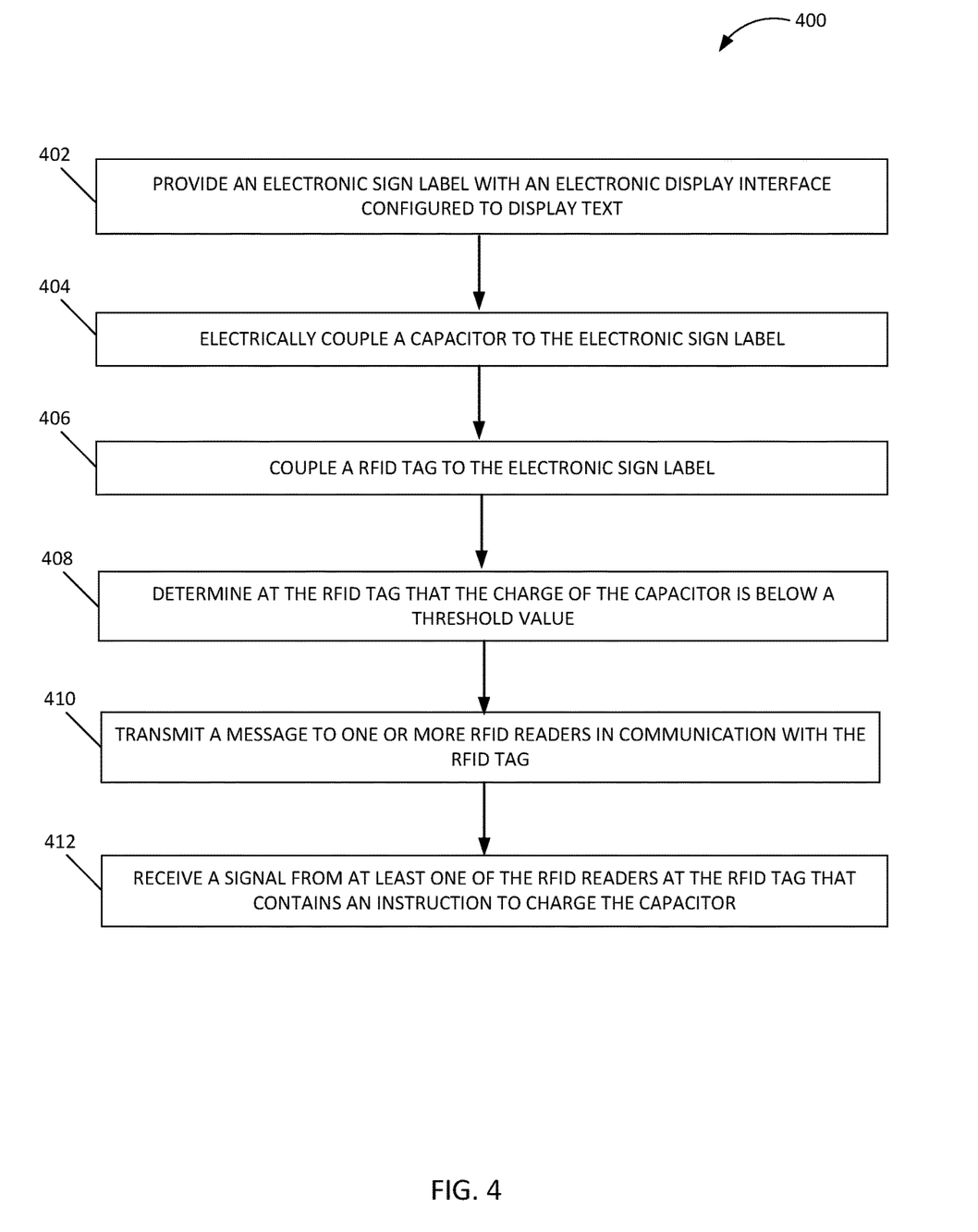
FIG. 4 is a flowchart illustrating an exemplary method for using an ESL system, according to an example embodiment.

FIG. 4 is a flowchart illustrating an exemplary method 400 for using an ESL system, according to example embodiments. The method 400 may be performed using one or more modules of the ESL system 100 described above.

At step 402, an electronic sign label 205 with an electronic display interface 210 is provided. The electronic display interface 210 is configured to display text that can be dynamically updated. At step 404, a capacitor 220 is coupled to the electronic sign label 205. In one embodiment, the capacitor 220 is a supercapacitor.

At step 406, a RFID tag 230 is coupled to the electronic sign label 205. In an example embodiment, the method 400 includes electrically coupling the antenna 234 of the RFID tag 230 to the capacitor 220 to allow the capacitor 220 to charge based on the energy collected by the RFID tag antenna 234.

At step 408, the charge module 120 determines at the RFID tag 230 that the charge of the capacitor 220 is below a threshold value. The threshold value may be a predetermined or predefined value stored in a database or memory of a computing device. In another embodiment, the threshold value may be stored in the memory of the RFID tag 230.

At step 410, the RFID module 110 transmits a message to the RFID readers 240 in communication with the RFID tag 230. In an example embodiment, the message transmitted by the RFID tag 230 includes a tag identifier number, and at least one of RFID readers 240 transmits the signal to the RFID tag 230 based on the tag identifier number.

At step 412, the RFID tag 230 receives a signal from at least one of the RFID readers 240 that contains an instruction to charge the capacitor 220. The signal from the RFID readers 240 charges the RFID tag 230.

In an example embodiment, the method 400 includes transmitting data from the computing device 240 to the RFID readers 240, where the data indicates an update to the text displayed at the electronic display interface 210 of the electronic sign label 205.

In an example embodiment, the method 400 includes receiving data from at least one of the RFID readers 240 at the RFID tag 230, storing the data in the memory 234 of the RFID tag 230, and transmitting an instruction from the RFID tag 230 to the electronic display interface 210 of the electronic sign label 205 to update the displayed text.

In an example embodiment, the electronic sign label is powered using a super capacitor. As described herein, the electronic sign label includes circuitry to determine that the power in the capacitor is getting low. One non-limiting method of measuring the power of the capacitor is to measure the voltage drop when there is a load on the capacitor.

When the electronic sign label detects that the power is low, it sends a signal, via the RFID tag, requesting power. The signal includes an identifier number for the RFID tag. In an example embodiment, one or more wireless power charging systems which include one or more RFID readers, picks up the signal from the electronic sign label on all of its antennas. In an example embodiment, information relating to the recharge request is stored, for example, the time of the request, the capacitor voltage at time of request, and the like. Based on the signal strength and phase the system may reverse engineer the signal and phase from each antenna to send a high-power signal back along the same path as the receiving signal. This signal converges in space to constructively interfere into a coherent carrier wave that can be rectified by the electronic sign label and the RFID tag to recharge the capacitor.

One of the advantages of the system described herein is that it is not necessary for the electronic sign label to be fully charged, since the system described herein can provide power to the electronic sign label upon request. The electronic sign label only needs enough charge to send out a signal requesting a recharge. In one embodiment, the electronic sign label may request a full charge, but the system may only charge the electronic sign label so that it lasts for a few seconds.

In one embodiment, the system described herein stores information relating to the broadcast configuration for the antennas so that it can send a power charge signal to the electronic sign label even if the electronic sign label does not request it. For example, the system may determine that it has time to recharge an electronic sign label and begin to do so without receiving a request.

Since the signal return path is known by the system, the system can modulate a signal along that path to communicate with the electronic sign label to update its display content. Since the return signal is only coherent at the antenna of the corresponding electronic sign label, only the electronic sign label at that location is updated. All the other electronic sign labels receive noise.

The voltage output of a super capacitor declines linearly as current flows. When the electronic sign label is using power from the capacitor the voltage of the capacitor drops by a known amount. In a non-limiting, the capacitor is configured to provide approximately 5.4 volts of power to the electronic sign label. When the electronic sign label uses power, the capacitor voltage may drop to approximately 5.2 volts. In an example embodiment, this power level is more than the threshold value and the RFID tag determines that the capacitor still has sufficient charge. However, when the electronic sign label draws power and the voltage of the capacitor drops below approximately 5.1 volts, then the RFID tag determines that the power is less than the threshold value and transmit a request for recharge. In this example, the electronic sign label still has the minimum required, approximately 5 volts, to transmit the request for a recharge. In an example embodiment, the request signal also includes the capacitor's current voltage. The RFID tag determines that the capacitor is fully charged when the voltage exceeds 5.4 volts.

In exemplary embodiments, the capacitor is configured to provide approximately 6 volts to 5 volts of power to the electronic sign label. In exemplary embodiments, the capacitor is determined to be of low charge when the power is in the range of approximately 5.8 volts to 4.5 volts. In exemplary embodiments, the minimum required power to transmit a recharge request is approximately 5.7 volts to 4 volts.

When the electronic sign label receives a request to update the display contents, the electronic sign label may respond by transmitting a signal including information related to a 'health check.' The health check may include the current voltage of the capacitor. Since the capacitor is under load at the time of the request, the current voltage informs the system of the current power of the capacitor.

In an example embodiment, the amount of power delivered to a particular electronic sign label is a function of the location of the electronic sign label relative to the RFID reader's antenna. If the system charges the electronic sign label for approximately 500 milliseconds, for example, and the reported voltage is still at the recharge threshold value then the system is configured to extend the recharging time in increments. In an example embodiment, the system increments the recharge time to approximately 1 second. The capacitor voltage is checked after the incremented recharge time. If the capacitor is still not fully charged, then the system is configured to increment the recharge time again. When the capacitor is determined to be fully charged, the recharge time required to charge the capacitor fully is stored for future reference.

The recharge times may change depending on the power demands of the electronic sign label. For example, if the electronic sign label begins to flash to draw customers' attention to a special message or special displayed content (e.g., a discount price, new item, etc.) then the voltage may drop faster than past events as stored by the system. In this event the system receives a request for recharge sooner than the system expected. However, the system described herein can respond to a recharge request within a fraction of a second, which advantageously reduces the risk of an electronic sign label losing power completely.

In an example embodiment, If the electronic sign label does lose all power so that it cannot request a recharge, the system is configured to determine that it has not received a usual recharge request from a particular electronic sign label based on the past stored recharge requests. The system stores the signal path to the electronic sign label, so it is able to construct a power delivery signal unilaterally.

In this manner, exemplary embodiments provide a system for a rechargeable electronic sign label that is coupled to a capacitor that can be charged remotely via RFID tags and RFID readers. The RFID readers can also be used to dynamically update the information displayed at the electronic sign labels.

Figure 5:
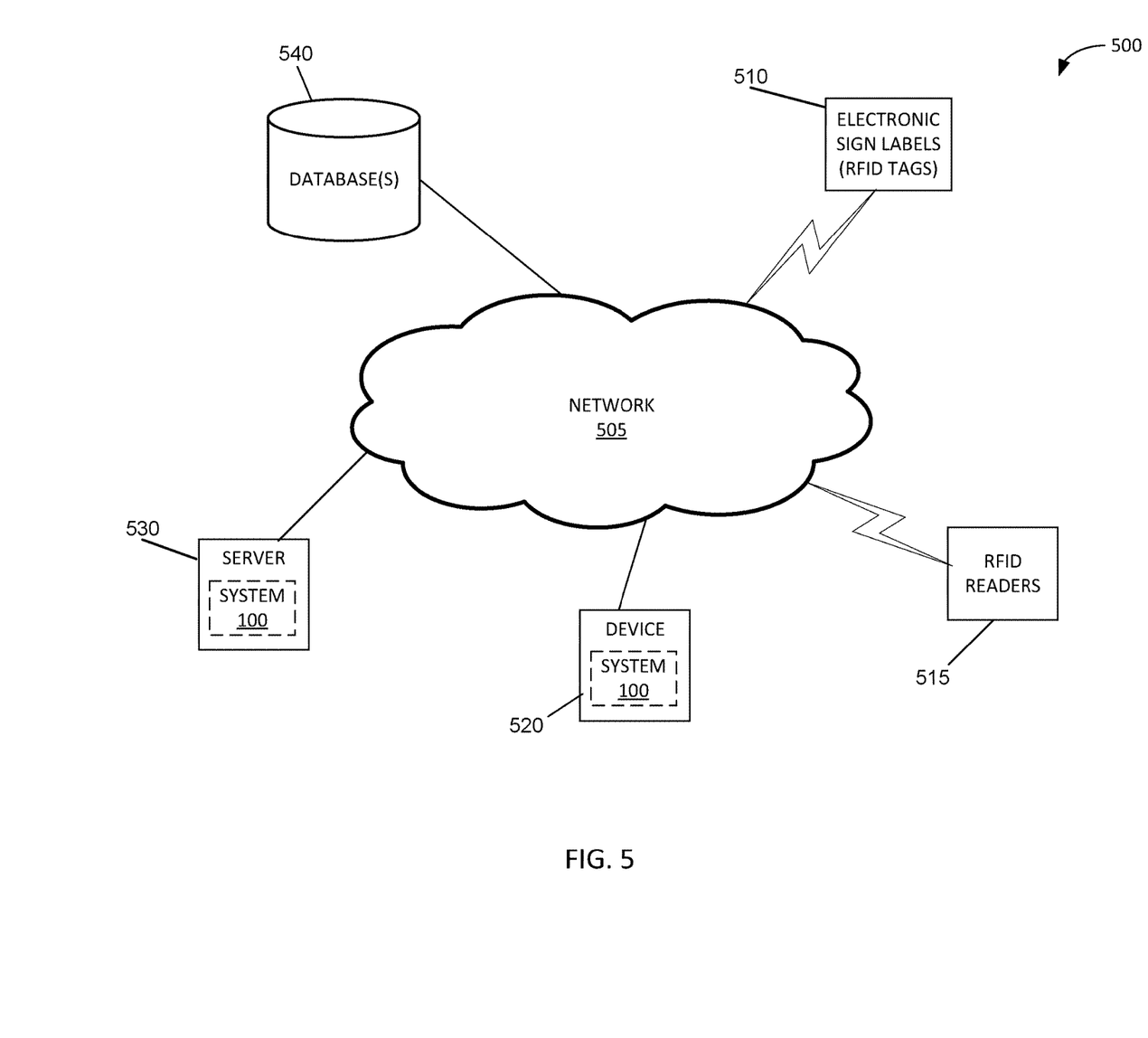
FIG. 5 is a diagram of an exemplary network environment suitable for a distributed implementation of exemplary embodiments.

FIG. 5 illustrates a network diagram depicting a system 500 for implementing the ESL system described herein, according to an example embodiment. The system 500 can include a network 505, electronic sign labels (RFID tags) 510, RFID readers 515, a device 520, a server 530, and database(s) 540. Each of the electronic sign labels (RFID tags) 510, RFID readers 515, device 520, server 530, and database(s) 540 is in communication with the network 505.

In an example embodiment, one or more portions of network 505 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The electronic sign labels 510 and the RFID tags may connect to the network 505 via wired or wireless connection. The electronic sign labels 510 are coupled to an RFID tag and a capacitor as described with respect to FIG. 2. The electronic sign labels 510 may be the electronic sign label 205 of FIGS. 2 and 3.

The RFID readers 515 may connect to the network 505 via wired or wireless connection. The RFID readers 515 may be the RFID readers 240 of FIGS. 2 and 3. The RFID readers 515 may transmit messages to and receive messages from RFID tags coupled to the electronic sign labels 510.

The device 520 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, and the like. The device 520 can include one or more components described in relation to computing device 600 shown in FIG. 6.

The device 520 may connect to network 505 via a wired or wireless connection. The device 520 may include one or more applications or systems such as, but not limited to, a web browser, an inventory management application, a price management application, an electronic sign label application based on the electronic sign label system described herein, and the like. In an example embodiment, the device 520 may perform some of the functionalities described herein. For example, the device 520 may transmit data to the RFID readers to update the RFID tags coupled to the electronic sign label to dynamically update the displayed text.

Each of the database(s) 540 and server 530 is connected to the network 505 via a wired connection. Alternatively, one or more of the database(s) 540 and server 530 may be connected to the network 505 via a wireless connection. Server 530 may include one or more computers or processors configured to communicate with the RFID readers 515 and/or the device 520 via network 505. Server 530 hosts one or more applications accessed by device 520 and/or facilitates access to the content of database(s) 540. The server 530 may perform some of the functionalities of the ESL system described herein. Database(s) 540 include one or more storage devices for storing data and/or instructions (or code) for use by server 530, and/or device 520. Database(s) 540 and server 530 may be located at one or more geographically distributed locations from each other or from device 520. Alternatively, database(s) 540 may be included within server 530.

Figure 6:
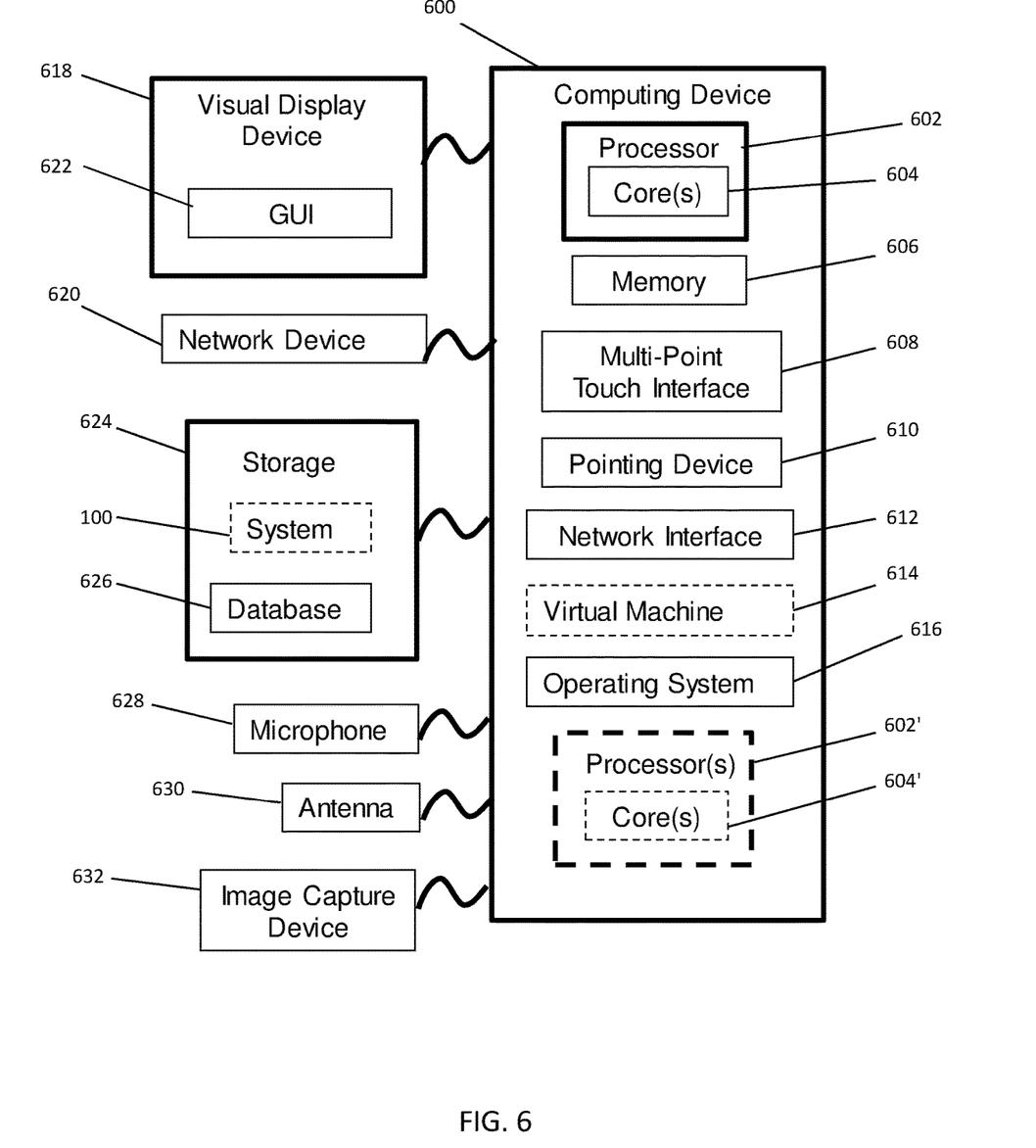
FIG. 6 is a block diagram of an exemplary computing device that may be used to implement exemplary embodiments.

FIG. 6 is a block diagram of an exemplary computing device 600 that can be used to perform the methods provided by exemplary embodiments. The computing device 600 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 606 included in the computing device 600 can store computer-readable and computer-executable instructions or software for implementing exemplary embodiments. The computing device 600 also includes processor 602 and associated core 604, and optionally, one or more additional processor(s) 602' and associated core(s) 604' (for example, in the case of computer systems having multiple processors/cores), for executing computer-readable and computer-executable instructions or software stored in the memory 606 and other programs for controlling system hardware. Processor 602 and processor(s) 602' can each be a single core processor or multiple core (604 and 604') processor.

Virtualization can be employed in the computing device 600 so that infrastructure and resources in the computing device can be shared dynamically. A virtual machine 614 can be provided to handle a process running on multiple processors so that the process appears to be using only one computing resource rather than multiple computing resources. Multiple virtual machines can also be used with one processor.

Memory 606 can include a computer system memory or random access memory, such as DRAM, SRAM, EDO RAM, and the like. Memory 606 can include other types of memory as well, or combinations thereof.

A user can interact with the computing device 600 through a visual display device 618, such as a touch screen display or computer monitor, which can display one or more user interfaces 619 that can be provided in accordance with exemplary embodiments. The visual display device 618 can also display other aspects, elements and/or information or data associated with exemplary embodiments. The computing device 600 can include other I/O devices for receiving input from a user, for example, a keyboard or other suitable multi-point touch interface 608, a pointing device 610 (e.g., a pen, stylus, mouse, or trackpad). The keyboard 608 and the pointing device 610 can be coupled to the visual display device 618. The computing device 600 can include other suitable conventional I/O peripherals.

The computing device 600 can also include one or more storage devices 624, such as a hard-drive, CD-ROM, or other computer readable media, for storing data and computer-readable instructions and/or software, such as the system 100 that implements exemplary embodiments of the sensor system described herein, or portions thereof, which can be executed to generate user interface 619 on display 618. Exemplary storage device 624 can also store one or more databases for storing suitable information required to implement exemplary embodiments. The databases can be updated by a user or automatically at a suitable time to add, delete or update one or more items in the databases. Exemplary storage device 624 can store one or more databases 626 for storing data such as information to be displayed at the electronic sign label, location of the RFID tags, location of the RFID readers, and other data/information used to implement exemplary embodiments of the systems and methods described herein.

The computing device 600 can include a network interface 612 configured to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of the above. The network interface 612 can include a built-in network adapter, network interface card, PCMCIA network card, card bus network adapter, wireless network adapter, USB network adapter, modem or another device suitable for interfacing the computing device 600 to a type of network capable of communication and performing the operations described herein. Moreover, the computing device 600 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 600 can run operating systems 616, such as versions of the Microsoft® Windows® operating systems, different releases of the Unix and Linux operating systems, versions of the MacOS® for Macintosh computers, embedded operating systems, real-time operating systems, open source operating systems, proprietary operating systems, operating systems for mobile computing devices, or another operating system capable of running on the computing device and performing the operations described herein. In exemplary embodiments, the operating system 616 can be run in native mode or emulated mode. In an exemplary embodiment, the operating system 616 can be run on one or more cloud machine instances.

The following description is presented to enable a person skilled in the art to create and use systems and methods for a rechargeable electronic sign label. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps can be replaced with a single element, component or step. Likewise, a single element, component or step can be replaced with multiple elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A system for using a rechargeable electronic sign label, the system comprising:
   an electronic sign label having an electronic display interface configured to display text and to be updated dynamically;
   a capacitor electrically coupled to the electronic sign label;
   an RFID tag coupled to the electronic sign label and having at least one antenna to collect energy and a memory to store data, wherein the stored data represents the text displayed at the electronic display interface, the at least one antenna of the RFID tag electrically coupled to the capacitor to allow the capacitor to charge based on the energy collected by the at least one antenna, the RFID tag configured to determine when the charge of the capacitor is below a threshold value by measuring a voltage drop at the capacitor and to transmit a message to one or more RFID readers in response to determining that the charge of the capacitor is below a threshold value; and
   the one or more RFID readers in communication with the RFID tag;
   wherein, at least one of the one or more RFID readers transmits a response signal in response to the message, the response signal directed to the RFID tag and including an instruction to charge the capacitor, energy from the response signal collected by the at least one antenna and used to charge the capacitor.

2. The system of claim 1, wherein the message transmitted by the RFID tag includes a tag identifier number, and the at least one of the one or more RFID readers transmits the response signal to the RFID tag based on the tag identifier number.

3. The system of claim 1, further comprising:
   a computing device in wireless communication with the one or more RFID readers, wherein the computing device is configured to transmit data to the RFID readers indicating an update to the text displayed at the electronic display interface of the electronic sign label.

4. The system of claim 3, wherein the RFID readers are configured to transmit the data from the computing device to the RFID tag, and the RFID tag stores the data in the memory causing the electronic display interface of the electronic sign label to update the text displayed.

5. The system of claim 1, wherein the one or more RFID readers reads the data in the memory of the RFID tag to determine the text presently displayed at the electronic sign label.

6. The system of claim 1, wherein the capacitor is a supercapacitor.

7. The system of claim 1, wherein the threshold value is approximately 5.1 volts.

8. A method for using a rechargeable electronic sign label, the method comprising:
   providing an electronic sign label having an electronic display interface configured to display text;
   electrically coupling a capacitor to the electronic sign label;
   coupling an RFID tag to the electronic sign label, the RFID tag having at least one antenna to collect energy and a memory to store data, the at least one antenna of the RFID tag electrically coupled to the capacitor to allow the capacitor to charge based on the energy collected by the at least one antenna, wherein the stored data represents the text displayed at the electronic display interface;
   determining with the RFID tag that the charge of the capacitor is below a threshold value by measuring a voltage drop at the capacitor;
   transmitting; a message to one or more RFID readers in communication with the RFID tag in response to determining that the charge of the capacitor is below a threshold value; and
   receiving a response signal from at least one of the one or more RFID readers in response to the message, the response signal directed to the RFID tag that contains an instruction to charge the capacitor, energy from response signal directed to the RFID tag by the one or more RFID readers collected by the at least one antenna and used to charge the capacitor.

9. The method of claim 8, wherein the message transmitted by the RFID tag includes a tag identifier number, and the at least one of the one or more RFID readers transmits the response signal to the RFID tag based on the tag identifier number.

10. The method of claim 8, further comprising:
    transmitting data from a computing device to the one or more RFID readers, the data indicating an update to the text displayed at the electronic display interface of the electronic sign label.

11. The method of claim 10, further comprising:
receiving the data from at least one of the one or more RFID readers at the RFID tag;
storing the data in the memory of the RFID tag, and
transmitting an instruction from the RFID tag to the electronic display interface of the electronic sign label to update the displayed text.

12. A system for using a rechargeable electronic sign label in a retail environment, the system comprising:
an electronic sign label affixed to a shelf housing an item, the electronic sign label having an electronic display interface configured to display a price of the item;
a supercapacitor electrically coupled to the electronic sign label;
an RFID tag coupled to the electronic sign label and having at least one antenna to collect energy and a memory to store data, wherein the stored data represents the text displayed at the electronic display interface, the at least one antenna of the RFID tag electrically coupled to the supecapacitor to allow the supercapacitor to charge based on the energy collected by the at least one antenna, the RFID tag configured to determine when the charge of the capacitor is below a threshold value by measuring a voltage drop at the capacitor and to transmit a message to one or more RFID readers in response to determining that the charge of the capacitor is below a threshold value; and
the one or more RFID readers in communication with the RFID tag;
wherein at least one of the one or more RFID readers transmits a response signal in response to the message, the response signal directed to the RFID tag and including an instruction to charge the supercapacitor, energy from the response signal directed to the RFID tag by the one or more RFID readers collected by the at least one antenna and used to charge the supercapacitor, and
wherein the one or more RFID readers are configured to transmit data to the RFID tag to display an updated price of the item on the electronic sign label.

13. The system of claim 12, wherein the message transmitted by the RFID tag includes a tag identifier number, and the at least one of the one or more RFID readers transmits the response signal to the RFID tag based on the tag identifier number.

14. The system of claim 12, further comprising:
a computing device in wireless communication with the one or more RFID readers, wherein the computing device is configured to transmit data to the RFID readers indicating an update to the price displayed at the electronic display interface of the electronic sign label.

15. The system of claim 14, wherein the RFID tag stores the data in the memory causing the electronic display interface of the electronic sign label to update the displayed price.

* * * * *